United States Patent [19]

Wombwell et al.

[11] Patent Number: 5,616,633
[45] Date of Patent: Apr. 1, 1997

[54] LIQUID EPOXY RESIN COMPOSITION

[75] Inventors: Paul T. Wombwell, Royston; Philip D. Willis, Bishop's Stortford; Christopher H. Bull, Cambridge, all of England

[73] Assignee: Ciba-Geigy Corporation, Tarrytown, N.Y.

[21] Appl. No.: 303,904

[22] Filed: Sep. 9, 1994

Related U.S. Application Data

[63] Continuation-in-part of Ser. No. 135,860, Oct. 12, 1993, abandoned, which is a continuation of Ser. No. 945,071, Sep. 15, 1992, abandoned.

[30] Foreign Application Priority Data

Sep. 20, 1991 [GB] United Kingdom .................. 9120078

[51] Int. Cl.$^6$ ............................. C08K 3/34; C08K 3/36; C08L 63/00
[52] U.S. Cl. ........................ 523/400; 523/443; 523/444; 523/466; 523/434
[58] Field of Search .................................... 523/400, 443, 523/444, 466, 434

[56] References Cited

U.S. PATENT DOCUMENTS

| | | | |
|---|---|---|---|
| 3,746,662 | 7/1973 | Adelman | 523/440 |
| 3,843,675 | 10/1974 | Porret | 523/466 |
| 4,569,956 | 2/1986 | Breitigan | 523/443 |
| 5,064,585 | 11/1991 | Cooper | 264/327 |
| 5,112,889 | 5/1992 | Ueji | 523/443 |
| 5,368,922 | 11/1994 | Portelli | 523/440 |

FOREIGN PATENT DOCUMENTS

| | | | |
|---|---|---|---|
| 0385949 | 9/1990 | European Pat. Off. | |
| 0333456 | 5/1992 | European Pat. Off. | |
| 0025594 | 3/1976 | Japan | 523/466 |
| 0161423 | 8/1985 | Japan | |
| 1323343 | 7/1973 | United Kingdom | |
| 2098153 | 11/1982 | United Kingdom | |

OTHER PUBLICATIONS

Lee, et al., "Handbook or Epoxy Resns", McGrawHill Book Co., New York, pp. 14/4–9, (1982 & Reissue).
Derwent Abst. 91–129195, [18], JP 03–068,673.
Abst. for JP 60155224.
Abst. for JP 61197624.
Abst. for JP 61088404.
H. Lee & K. Neville (Handbook of Epoxy Resins pp. 15–34, (1982 Reissue).
H. Lee & K. Neville (Handbook of Epoxy Resins) pp. 14–4 to 9 (1982 Reissue.
Encyl. Pol. Sci & Eng. H. Mark et al. ed., vol. 14, John Wiley & Sons pp. 459–462 (1988).

*Primary Examiner*—D. R. Wilson
*Attorney, Agent, or Firm*—William A. Teoli, Jr.; David R. Crichton

[57] ABSTRACT

The present invention provides a liquid epoxy resin composition that includes an epoxy resin, at least one filler and an inorganic thixotropic agent in an amount effective to reduce settling of said filler at ambient temperatures. The composition further includes a polymer powder that dissolves in and thickens the composition when the composition is heated. The polymer powder is added in an amount effective to reduce settling of said filler at temperatures up to the gelling temperature of the composition. The thixotropic agent is added in an amount that the resulting epoxy resin composition is a free-flowing liquid. The composition may optionally further include a curing agent.

11 Claims, No Drawings

LIQUID EPOXY RESIN COMPOSITION

This is a continuation-in-part of Ser. No. 08/135,860 filed Oct. 12, 1993, now abandoned, which is a continuation of Ser. No. 07/945,071, filed Sep. 15, 1992, now abandoned.

The present invention relates to a filled resin formulation, especially an epoxy resin formulation.

Epoxy resins can be used to make moulded articles by what is called the Automatic Pressure Gelation process (APG). In this process which is described for example in GB 1323343 and EP 0333456 an epoxy resin and curing agent are mixed at a temperature at which they are liquid, usually 40°–60° C. The mixture is then passed, under slight pressure, into a mould which is at a high enough temperature for gelling and curing to take place. Further mixture is supplied to the mould under the application of pressure to compensate for shrinkage of the composition until the composition has set.

When epoxy resins are used to make moulded articles in the APG process, the finished product usually contains one or more fillers. These are added to the resin or to the resin/curing agent mixture, before curing. Fillers can be organic or inorganic and are used for various reasons for example as a modifying agent, to improve abrasion resistance, to give special effects or as a bulking agent.

In some cases, e.g. when using a filler as a bulking agent, a large amount is desirable. When using a filler to produce a decorative effect, large particle sizes are usually needed in relatively low additions.

If the main filler contains relatively coarse fractions, and certainly if large decorative mineral particles are present there is a tendency for sedimentation to occur. This can manifest itself during storage of the resin filler premix, or in the warm-hot resin hardener filler mixture during processing or, most rapidly, in the very hot mixture in the mould prior to cross-linking. This last effect results in a product with an uneven distribution of filler and hence, where decorative particles are present, an uneven decorative effect and inconsistent mechanical properties.

The conventional method for preventing settlement of coarse fillers is to incorporate a thixotropic agent. However, the degree of thixotropy needed to keep very coarse, high density particles in suspension is so great as to render the mixture unworkable by the APG process. Thus the pressures needed to transfer the mixture would greatly exceed the 3 bar level considered to be a safe maximum.

We have shown that incorporation of a polymer powder which dissolves at a temperature lying between that of the resin hardener mixture (about 70° C.) and that of the mould (about 170° C.) greatly reduces the settlement of the coarse decorative filler during cure but, being in the undissolved form, it does not keep the coarse decorative filler or the finer main filler sufficiently in suspension either in the stored resin-filler premix or in the warm resin-hardener filler mixture.

We have now found that the problem can be overcome by adding to the epoxy resin both a small amount of a thixotropic agent and a suitable finely divided polymer.

Accordingly the present invention provides a liquid epoxy resin composition comprising an epoxy resin, at least one filler, an inorganic thixotropic agent in an amount effective to reduce settling of said filler at ambient temperatures and a polymer which dissolves in and thickens the composition when it is heated prior to curing in an amount effective to reduce settling of said filler at temperatures up to the gelling temperature of said composition and, optionally, a curing agent.

The epoxy resin compositions of the invention, prior to casting, are liquids which flow freely under gravity such that, for example, a 200 ml beaker filled with the liquid epoxy resin composition would deliver at least 90 percent of its contents within five minutes when inverted.

A wide range of fillers may be used, both fine and coarse particles. The filler may be inorganic such as clays, silica, chalk, mica powder, glass powder, glass beads, powdered glass fibre, aluminium hydroxide and magnesium hydroxide, or organic such as powdered poly(vinyl chloride), nylon, polyethylene, polyester or cured epoxy resin.

Mixtures of fillers may be used. For example in order to give a granite-like effect in the moulded product a mixture of calcined china clay and black mica of relatively large particle size may be used, for instance about 0.5 mm.

In general fillers having a particle size of from 10 to 10,000 microns may be used, preferably from 50 to 4000 microns. The amount of filler may be up to 400 parts by weight per 100 parts by weight of epoxy resin, preferably up to 300 parts by weight.

Suitable thixotropic agents include highly dispersed silicas, bentonite and silicates. The thixotropic agent is used in an amount less than that necessary to impart thixotropic properties to the resin. It may be used in amounts of from 0.5 to 10 parts by weight per 100 parts by weight of epoxy resin, preferably 1 to 3 parts by weight. The thixotropic agent helps to prevent the filler from settling, especially at the temperature used for mixing the epoxy resin with a curing agent.

At higher temperatures such as those reached just prior to gelling in the mould, the viscosity of the mixture decreases and the thixotropic agent alone is insufficient to prevent the filler from settling. Its performance is enhanced according to the invention by the use of a polymer which dissolves in and thickens the hot mixture of epoxy resin and curing agent. This thickening prevents the filler from settling at temperatures up to the gelling temperature of the mixture.

Any polymer which is insoluble or has a very slow solution rate in the cold epoxy resin and in the warm/hot resin-hardener mixture but which is rapidly soluble in the very hot resin-hardener mixture and which enhances the effect of the thixotropic agent may be used. Examples of suitable polymers include poly (vinyl butyrals), polyoxyethylenes, poly(vinyl formals), polycaprolactones and polyamides. The polymer may be used in amounts of from 0.5 to 20 parts by weight per 100 parts by weight of epoxy resin, preferably from 1 to 3 parts by weight.

The epoxide resin may be a cycloaliphatic epoxide resin, i.e. a resin which has a least one epoxide group in which the oxygen atom is attached to carbon atoms in a cycloaliphatic ring, a N-glycidylamine, a polyglycidyl ester of a polycarboxylic acid or a polyglycidyl ether of a polyhydric alcohol or phenol. The curing agent for the epoxide resin may be a cycloaliphatic or aromatic polyamine, a polyhydric phenol, a polycarboxylic acid anhydride, or a catalytic curing agent such as a boron trifluoride-amine complex or an imidazole. Preferred resin compositions include those comprising at least one polyglycidyl ether of a polyhydric phenol such as 2,2-bis(4-hydroxyphenyl)propane (bisphenol A), bis(4-hydroxyphenyl)methane (bisphenol F), a phenol formaldehyde novolak or a cresol-formaldehyde novolak, and as curing agent, a polycarboxylic acid anhydride such as phthalic anhydride, tetrahydrophthalic anhydride, methyltetrahydrophthalic anhydride, hexahydrophthalic anhydride, methylhexahydrophthalic anhydride, methylendomethylenetetrahydrophthalic anhydride, alkenylsuccinic anhydrides, maleic anhydride, succinic anhydride, glutaric anhydride or fumaric anhydride.

Epoxide resin compositions used in the method of the invention may also include an accelerator for the cure of the resin with the chosen curing agent. Accelerators suitable for the cure of an epoxide resin with a particular curing agent are well known to those skilled in the art of curing epoxide resins.

The composition of the invention may be mixed with a curing agent and stored for long periods at ambient temperature when a curing agent is used which only cures to a significant extent at higher temperatures. In these cases the thixotropic agent prevents settlement of the filler during storage.

Therefore the invention also provides a composition comprising an epoxy resin, at least one filler, a thixotropic agent in an amount less than that necessary to impart thixotropic properties, a curing agent for the epoxy resin which only substantially cures the resin at elevated temperatures and a polymer which dissolves in and thickens the composition when it is heated prior to curing.

Suitable curing agents for use in this composition include the anhydrides mentioned above.

Other additives conventionally employed in moulding resin compositions may also be included in the composition. Examples of such additives are pigments, dyes, fibres such as glass and carbon fibres, flame retardants, antioxidants, light stabilisers, UV absorbers and surfactants.

Examples of suitable antioxidants include alkylated monophenols, alkylthiomethylphenols, hydroquinones and alkylated hydroquinones, hydroxylated thiodiphenyl ethers, alkylidenebisphenols, O-, N- and S-benzyl compounds, hydroxybenzylated malonates, hydroxybenzyl aromatics, triazine compounds, benzylphosphonates, acylaminophenols, esters and amides of β-(3,5-di-tert-butyl-4-hydroxyphenyl) propionic acid, esters of β-(5-tert-butyl-4-hydroxy-3-methylphenyl) propionic acid, esters of β-(3,5-dicyclohexyl-4-hydroxyphenyl) propionic acid, esters of 3,5-di-tert-butyl-4-hydroxyphenyl acetic acid.

Examples of suitable UV absorbers and light stabilisers include 2-(2'-hydroxyphenyl) benzotriazoles, 2-hydroxybenzophenones, esters of substituted and unsubstituted benzoic acids, acrylates, nickel compounds, sterically hindered amines, oxalic acid diamides and 2-(2-hydroxyphenyl)-1,3,5-triazines.

The compositions of the invention may be used for the production of mouldings having thin or thick walls (cross sections). They are also particularly suitable for the production of mouldings having a large surface area, at least one large linear dimension or a complex shape. The compositions may be used, for instance, in the moulding of domestic sanitary ware such as sinks, baths, shower trays and basins, sheet slabstock for use in the production of articles such as domestic worktops, chemically resistant containers such as tanks and parts such as pumps, valves and pipes for handling corrosive fluids and impact-resistant mouldings for use in cars and other vehicles, and electrical applications.

The present invention also provides a process for making a cured plastics moulding by introducing a pre-heated curable resin composition to a hotter mould which is at a temperature high enough to initiate curing of the resin and supplying further resin under pressure to compensate for shrinkage of the composition wherein the curable resin comprises an epoxy resin composition as described above.

The invention is illustrated by the following Examples, in which "parts" are parts by weight.

EXAMPLE 1

Epoxy resin compositions are made with the following compounds in the amounts specified in Table 1 below.

The epoxy resin is a liquid modified bisphenol A epoxy resin with an epoxy content of 5.2 mol/kg.

Green colouring paste based on a liquid bisphenol A epoxy resin.

Poly(vinyl butyral) sold under the trade name Mowital B70H by Hoechst.

A finely divided silica under the trade name Silica Flour Z 300.

A coarse calcined china clay sold under the trade name Molochite 22/60.

Black mica of particle size about 0.5 mm.

A hydrophobic highly dispersed silica sold under the trade name Aerosil R 202 by Degussa.

TABLE 1

| COMPOUND | PARTS | |
| --- | --- | --- |
| Epoxy resin | 100 | 100 |
| Green colouring paste | 0.1 | 0.1 |
| Poly(vinyl butyral) | 1.0 | 2.0 |
| Finely divided silica | 200 | 200 |
| Highly dispersed silica | 2.5 | 3.0 |
| Coarse calcined china clay | 60 | 60 |
| Black mica | 10 | 10 |

100 Parts by weight of each of these compositions, which are free flowing liquids, are mixed with 21 parts of a liquid methyltetrahydrophthalic anhydride hardener. The mixture is then heated to above 120° C. and then moulded. In each case the resulting moulded product has an even granite-like effect.

EXAMPLE 2

Epoxy resin and hardener compositions are made with the following compounds in the amounts specified in Table 2 below.

The epoxy resin is a liquid bisphenol A epoxy resin with an epoxy content of 5.3 mol/kg.

Brown colouring paste based on liquid bisphenol A epoxy resin.

Sterically hindered phenol antioxidant.

Surfactant sold under the trade name Fluorad FC 430 by 3M.

Liquid methyltetrahydrophthalic anhydride hardener.

A boron trichloride / amine complex accelerator.

Poly(vinyl butyral) sold under the trade name Mowital B70H by Hoechst.

A mixture of finely divided silicas sold under the trade names Silica Fluor Z 300 and M 500.

A hydrophobic highly dispersed silica sold under the trade name Aerosil R 202 by Degussa.

TABLE 2

| COMPOUND | PARTS | |
| --- | --- | --- |
| Epoxy resin | 100 | 100 |
| Brown Colouring paste | 1.5 | 1.5 |
| Antioxidant | 2.0 | 2.0 |
| Surfactant | 0.5 | 0.5 |
| Hardener | 85 | 85 |
| Accelerator | 1.0 | 1.0 |
| Poly(vinyl butyral) | 3.0 | 5.0 |
| Finely divided silica mixture | 215 | 215 |
| Highly dispersed silica | 2.0 | 2.0 |

The mixture is a stable free-flowing liquid at room temperature. The mixtures are sprayed onto a vertical, heated metal surface at 150° C. In each case a layer 1–2 mm in thickness is obtained which does not flow down the surface of the heated metal. After 5–10 minutes the coating cures to a hard tough material.

EXAMPLE 3

Seven 50 g castings (110 mm in length and 20 mm diameter) are prepared by gelling epoxy resin compositions at 100° C. After the resin is cured the specific gravity (SG) is measured at the top and bottom of the castings. The difference in SG is a measure of filler settlement.

The epoxy resin used is a liquid bisphenol A epoxy resin having an epoxy content of 5.3 mol/kg (100 parts). The filler is a coarse calcined china clay as in Example 1 (120 parts). The curing agent used is liquid methyl tetrahydrophthalic anhydride (85 parts) with 1-methylimidazole (0.25 parts) as accelerator. To the epoxy resin is added, as thixotropic agent, a hydrophobic highly dispersed silica sold under the Trade Name Aerosil R 805. Polymers added are poly(vinyl butyral) sold under the Trade Name Mowital B70H; polyoxyethylene, sold under the Trade Name Polyox Coagulant; and poly(vinyl formal) sold under the Trade Name Siva Formvar. The amounts of thixotropic agent and polymer used in the samples and the SG differences are shown in Table 3. In each case the compositions, prior to casting, are free-flowing liquids.

TABLE 3

| THIXOTROPIC AGENT (PARTS) | POLYMER (PARTS) | S G DIFFERENCE |
| --- | --- | --- |
| 3.0 | — | 0.33 |
| 3.0 | 2.0 poly(vinyl butyral) | 0 |
| 3.0 | 2.0 polyoxyethylene | 0 |
| 3.0 | 2.0 poly(vinyl formal) | 0 |
| — | 2.0 poly(vinyl butyral) | 0.26 |
| — | 2.0 polyoxyethylene | 0.29 |
| — | 2.0 poly(vinyl formal) | 0.30 |

It can be seen that no settling occurs when both the thixotropic agent and polymer are used, but some settling occurs if only one of these compounds is used.

EXAMPLE 4

Following the procedure of Example 3, five castings are made at a gelling temperature of 120° C.

The epoxy resin is a mixture of 80 parts of that used in Example 3 with 20 parts of butane-1,4-diol diglycidyl ether. The filler is 60 parts of that used in Example 1 and the hardener is 36 parts of a liquid aromatic amine containing 4,4'-diaminodiphenyl methane. The thixotropic agent is a hydrophilic highly dispersed silica sold under the Trade Name Aerosil 200.

The amount of thixotropic agent and polymer used (as in Example 3) and the SG difference is shown in Table 4. In each case, prior to casting, the compositions are free-flowing liquids.

TABLE 4

| THIXOTROPIC AGENT (PARTS) | POLYMER (PARTS) | S G DIFFERENCE |
| --- | --- | --- |
| 1.0 | — | 0.25 |
| 1.0 | 2.0 poly(vinyl butyral) | 0.05 |
| 1.0 | 2.0 polyoxyethylene | 0 |
| — | 2.0 poly(vinyl butyral) | 0.31 |
| — | 2.0 polyoxyethylene | 0.29 |

It can be seen that no or almost no settling occurs when both the thixotropic agent and polymer are used, but some settling occurs when only one of these compounds is used.

EXAMPLE 5

Following the procedure of Example 3, seven castings are made at a gelling temperature of 120° C.

The epoxy resin is a mixture of a solid bisphenol A epoxy resin with an epoxy content of about 2.4 mol/kg (50 parts) and a semi-solid epoxy phenol novolak resin with an epoxy content of about 5.6 mol/kg (50 parts). The filler is 80 parts of coarse silica sand. The resin is cured using 70 parts of a curing agent comprising a mixture of tetrahydrophthalic anhydride and phthalic anhydride together with 0.25 parts of 2-ethyl-4-methylimidazole as accelerator. The thixotropic agent is a hydrophobic highly dispersed silica sold under the Trade Name Aerosil R 202. The poly(vinyl butyral) and poly(vinyl formal) are as in Example 3. The polycaprolactone is that sold under the Trade Name CAPA 601M.

The amount of thixotropic agent and polymer used and the SG difference is shown in Table 5. In each case, prior to casting, the compositions are free-flowing liquids.

TABLE 5

| THIXOTROPIC AGENT (PARTS) | POLYMER (PARTS) | S G DIFFERENCE |
| --- | --- | --- |
| 2.6 | — | 0.45 |
| 2.6 | 3.0 poly(vinyl butyral) | 0 |
| 2.6 | 2.6 poly(vinyl formal) | 0 |
| 2.6 | 2.6 polycaprolactone | 0 |
| — | 3.0 poly(vinyl butyral) | 0.25 |
| — | 2.6 poly(vinyl formal) | 0.28 |
| — | 2.6 polycaprolactone | 0.25 |

It can be seen that no settling occurs when both the thixotropic agent and polymer are used, but some settling occurs when only one of these compounds is used.

We claim:

1. A liquid epoxy resin composition comprising an epoxy resin, at least one filler, an inorganic thixotropic agent in an amount effective to reduce settling of said filler at ambient temperatures and a polymer powder which dissolves in and thickens the composition when it is heated prior to curing in an amount effective to reduce settling of said filler at temperatures up to the gelling temperature of said composition and, optionally, a curing agent, wherein the resulting epoxy resin composition is a free-flowing liquid at room temperature when subjected to a pressure of 3 bar or less.

2. A composition as claimed in claim 1 which also comprises a curing agent for the epoxy resin.

3. A composition as claimed in claim 2 in which the curing agent is one which only substantially cures the resin at higher than ambient temperatures.

4. A composition as claimed in claim 1 in which the amount of filler is up to 400 parts by weight per 100 parts by weight of epoxy resin.

5. A composition as claimed in claim 1 in which the thixotropic agent is bentonite, a silicate, or a highly dispersed silica.

6. A composition as claimed in claim 1 in which the amount of thixotropic agent is from 0.5 to 10 parts by weight per 100 parts by weight of epoxy resin.

7. A composition as claimed in claim 1 in which the polymer is a poly(vinyl butyral), a polyoxethylene, a poly(vinyl formal), a polycaprolactone or a polyamide.

8. A composition as claimed in claim 1 in which the amount of polymer is from 0.5 to 20 parts by weight per 100 parts by weight of epoxy resin.

9. A composition as claimed in claim 1 in which the inorganic thixotropic agent is a hydrophobic highly dispersed silica and the polymer powder is a poly(vinyl formal).

10. A liquid epoxy resin composition according to claim 1 wherein at least one filler has a particle size of about 0.5 millimeters.

11. A liquid epoxy resin composition for use in a process for making cured plastic moldings by introducing a preheated curable resin composition to a hotter mold which is at a temperature high enough to initiate curing of the resin and supplying further resin under pressure to compensate for shrinkage of the composition comprising an epoxy resin, at least one filler, an inorganic thixotropic agent in an amount effective to reduce settling of said filler at ambient temperatures and a polymer powder which dissolves in and thickens the composition when it is heated prior to curing in an amount effective to reduce settling of said filler at temperatures up to the gelling temperature of said composition and, optionally, a curing agent, wherein the resulting epoxy resin composition is a free-flowing liquid at room temperature when subjected to a pressure of 3 bar or less.

\* \* \* \* \*